Figure 3:
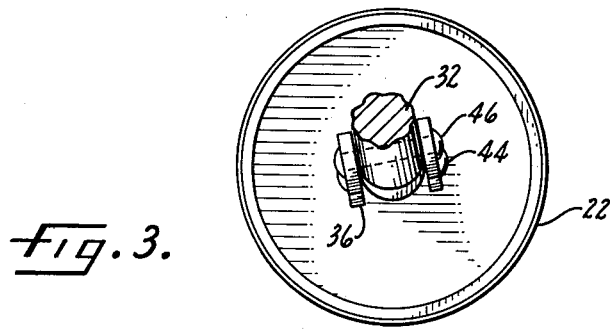

Feb. 26, 1963 T. R. DAVIS 3,078,982
BELT TRAINING TROUGHING IDLER ASSEMBLY
Filed April 5, 1960 2 Sheets-Sheet 1
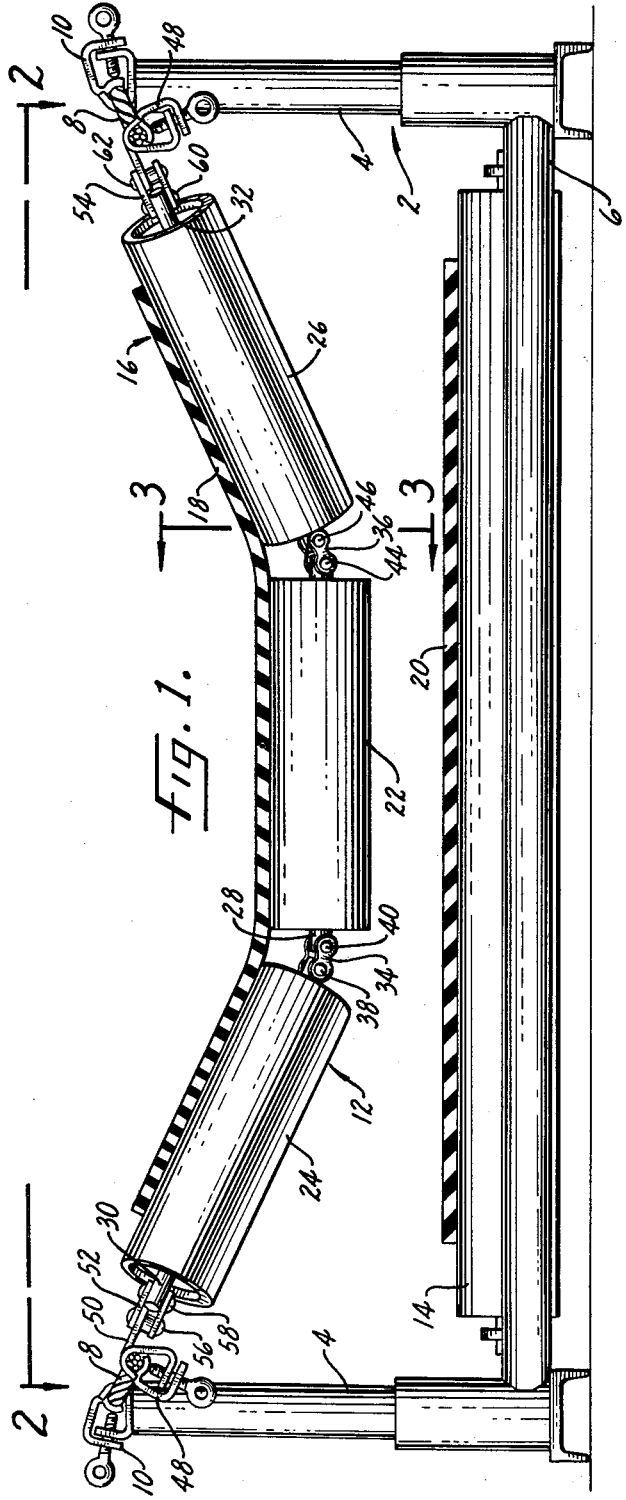
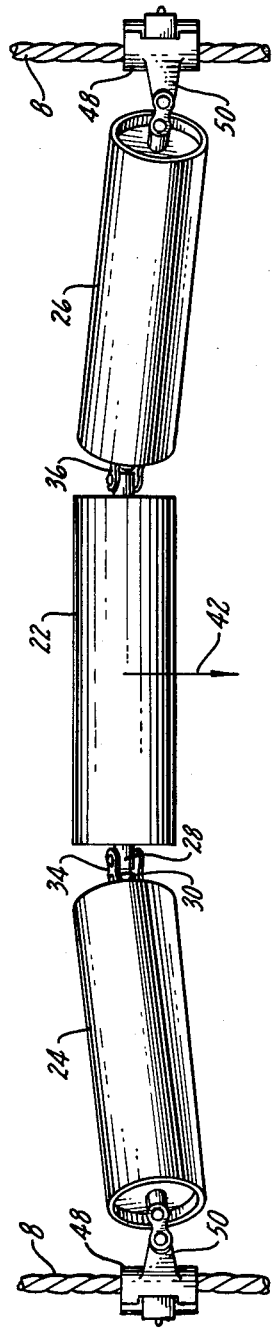
INVENTOR.
Thomas R. Davis,
BY
Parker & Carter
Attorneys.

Feb. 26, 1963  T. R. DAVIS  3,078,982
BELT TRAINING TROUGHING IDLER ASSEMBLY
Filed April 5, 1960  2 Sheets-Sheet 2

INVENTOR.
Thomas R. Davis,
BY Parker & Carter
Attorneys.

United States Patent Office 3,078,982
Patented Feb. 26, 1963

3,078,982
BELT TRAINING TROUGHING IDLER
ASSEMBLY
Thomas R. Davis, McHenry, Ill., assignor to Goodman Manufacturing Company, Chicago, Ill., a corporation of Illinois
Filed Apr. 5, 1960, Ser. No. 20,048
1 Claim. (Cl. 198—192)

This invention relates in general to troughing idler assemblies for rope sideframe conveyors and more specifically to a new and improved idler assembly for training the conveyor belt.

Rope sideframe conveyors have come into wide use during the past few years for the transport of bulk solid materials such as ore or the like. Generally they include a pair of flexible wire ropes or the like hung on support stands spaced at equal intervals. A series of troughing idler assemblies are suspended between the flexible strands at substantially regular intervals. The idler assemblies generally include a roller assembly having rollers supported for rotation about dead shafts linked together in articulated relationship. In one conventional type, a center roller and two wing rollers are employed to provide a series of three idler rollers in each troughing idler assembly suspended between the flexible ropes. The two wing rollers are generally pivotally connected to the center roller and pivotally connected to hooks or the like at their outer ends, the hooks being secured to the side ropes.

Maintaining the conveyor belt centered relative to the series of idler roller assemblies has sometimes been a problem with these conveyors. The wing rollers tend to assume a swept wing configuration relative to the direction of conveyor belt travel as the frictional effect of the conveyor belt on the rollers sweeps the center roller downstream relative thereto. Each wing roller normally tends to drive the belt in a direction perpendicular to the axis of the roller and consequently each of the now backwardly canted wing rollers exerts a substantial lateral force on the conveyor belt. The lateral force exerted by a wing roller is roughly a function of the amount of belt area contacted by that roller. It is easily seen then that if one wing roller contacts more belt than the other wing roller, an overall detraining effect is exerted on the belt. One of the wing rollers may contact more belt for any of a number of reasons. Misalignment of the idler assemblies between the strands can cause a running wild or detraining effect by initially throwing the belt off center. A slight displacement laterally of the flexible ropes or portions thereof between adjacent supports also has a tendency to promote the detraining effect.

A number of remedies are employed in industries using these flexible strand conveyors to any considerable extent. In one instance vertical rollers are provided on the individual support assemblies adjacent the sides of the travelling conveyor belt. The belt in any detraining movement contacts the vertically mounted side rollers and is maintained in substantially centered relationship relative to the idler assemblies by the restricting effect of the vertical rollers. An assembly employing this construction is effective in operation but relatively expensive initially due to the additional roller systems. It is also more difficult to maintain due to the greater number of moving parts. Other training means are known and used successfully but in general they require a substantial amount of adjustment.

Accordingly, a primary object of this invention is to provide a troughing idler assembly for rope side-frame conveyors which is easily pre-set and requires no fine adjustments to provide a proper training effect.

Yet another object is to provide a troughing idler assembly wherein the wing rollers are canted forwardly in the direction of conveyor belt travel and maintained in a substantially forwardly canted attitude by simple connector means.

Yet another object is to provide a flexible troughing idler assembly for a rope sideframe conveyor which provides a positive training effect upon the travelling conveyor belt and yet is simple in construction and economical to manufacture and maintain.

Other objects of this invention will become apparent from the following description in the specification and claim wherein like reference numerals identify like parts throughout.

Figure 4:
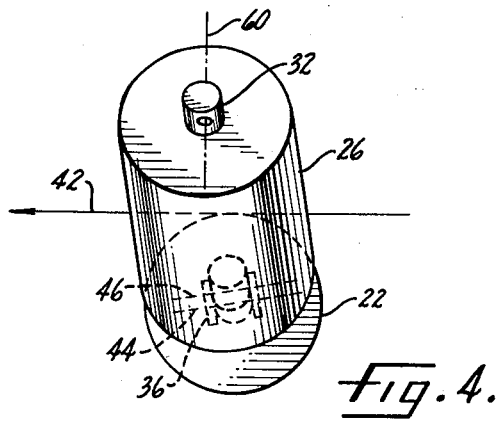

The invention is illustrated more or less diagrammatically in the accompanying drawings wherein:

FIGURE 1 is a front elevation of a troughing idler assembly embodying this invention and its associated support means, FIGURE 2 is a plan view of the troughing idler assembly in FIGURE 1 taken substantially along line 2—2 of FIGURE 1 with parts omitted for clarity, FIGURE 3 is a sectional view of an idler roller and its associated connecting link taken along line 3—3 of FIGURE 1, and FIGURE 4 is a schematic view in side elevation of an idler roller assembly showing the relative relationship of the pivotal axes of the connecting links.

A portion of the rope sideframe conveyor is shown generally at 2 in FIGURE 1. It includes support stands 4 rigidly spaced by crossbar 6. Flexible ropes are secured at the top of each support stand by clamps 10. Shown generally at 12 suspended from ropes 8 is a troughing idler assembly. A return roller 14 is supported on crossbar 6. The conveyor belt shown generally at 16 has a carrying reach 18 supported by the troughing idler assembly and a return reach 20 carried by the return roller 14.

The troughing idler assembly 12 includes a center roller 22 and wing rollers 24 and 26. Center roller 22 is supported for rotation about dead shaft 28. Wing roller 24 is supported for rotation about dead shaft 30. Wing roller 26 is supported for rotation about dead shaft 32. The wing rollers 24 and 26 are canted forwardly relative to the center roller 22 in the direction of conveyor belt travel as best seen in FIGURE 2.

The dead shafts 28 and 30 are connected together in articulated relationship by link 34 and dead shaft 32 is connected to dead shaft 28 by link 36 in like manner. The pivotal axes 38 and 40 of link 34 are pre-set in attitudes substantially downwardly tilted relative to the direction of conveyor belt travel 42. The pivotal axes 44 and 46 of link 36 are similarly pre-set in an attitude substantially downwardly tilted relative to the direction of conveyor belt travel, as shown in FIGURE 4.

Clamped to the ropes 8 are connector clamps 48 having ears 50 extending rigidly inwardly therefrom. Connecting the outer end of dead shaft 30 with a corresponding ear 50 is link 52 and connecting the outer end of dead shaft 32 with a corresponding ear 50 is link 54. The pivotal axes 56 and 58 of link 52 maintain attitudes substantially perpendicular to the direction of conveyor belt travel. The pivotal axes 60 and 62 of link 54 maintain similar attitudes relative to the direction of conveyor belt travel, as shown in FIGURE 4. The relative attitudes of the aforementioned pivotal axes in relation to the direction of conveyor belt travel are best shown in FIGURE 4.

The use, operation and functions of this invention are as follows:

It can be seen that axes 56 and 58 of link 52 and axes 60 and 62 of link 54 tend to permit rollers 24 and 26 to pivot forwardly or rearwardly in planes parallel to the direction of conveyor belt travel only. This is true regardless of the amount of load on the conveyor belt. Since axes 38 and 40 of link 34 and axes 44 and 46 of link 36 are tilted downwardly relative to the direction of conveyor belt travel, it can also be seen that they will not permit rollers 24 and 26 to pivot directly forwardly and backwardly. Consequently, the wing rollers, when pre-set in a forwardly canted attitude relative to the direction of conveyor belt travel, will be fixed in this attitude by center roller 22. This holds true for a fixed load on the conveyor belt 16 but varies somewhat as the load increases and decreases.

For example, if the load on the conveyor carrying reach 18 increases, the idler assembly will tend to trough to a greater extent and cable 8 will stretch allowing wing rollers 24 and 26 to assume greater troughing angles. The links 34 and 36 will only permit wing rollers 24 and 26 to pivot backwardly, however, as they swing down to a greater troughing angle and consequently the cant of the wing rollers tends to slightly increase as the load increases. It can now be seen that any pre-set forwardly canted attitude of the wing rollers 24 and 26 will be maintained, or the degree of cant will actually increase, during the operation of the conveyor. No lessening of the training effect of the forwardly canted wing rollers develops from no load to full load operation.

In their canted attitude, rollers 24 and 26 have a tendency to direct the belt contacting these rollers downwardly towards the center roller 22. Since it is known that the total training effect exerted on the belt by rollers 24 and 26 is proportionately dependent upon the angle of cant of the rollers plus the amount of belt area contacting each of these rollers, a compensating centering effect will be exerted by the wing rollers on the belt as long as an equal width of the conveyor belt remains in contact with each wing roller. If the belt should run up on one wing roller and correspondingly downwardly on the oposite wing roller, the wing roller, carrying more belt will exert more of a centering effect than the opposite wing roller and will tend to train the belt back to centered relationship on the troughing idler assembly.

By use of this unique construction, the attitude of the idler rollers of the troughing idler assembly for a rope side frame conveyor can be easily pre-set to provide a simple and economical conveyor belt training device.

Throughout the specification and claim the terms "backward" and "backwardly" described a canted condition of the wing rollers in which the outer ends of the wing rollers lie upstream of the inner ends while "forward" and "forwardly" describe a condition wherein these outer ends lie downstream of the inner ends.

The foregoing description of this invention is illustrative only and not intended to be definitive. Accordingly, this invention should not be limited except by the scope of the appended claim.

I claim:

A belt training troughing idler assembly for use in a rope sideframe conveyor of the type in which the conveying reach of an endless orbitally movable conveyor belt is supported by a plurality of troughing idler assemblies suspended between a pair of rope sideframes which are trained in generally parallel relationship one to the other along a conveying course,
- one of said belt training troughing idler assemblies being especially adapted to exert a substantial training effect on the conveying reach of the belt in unloaded and loaded conditions,
- said belt training troughing idler assembly including, in combination,
- a roller assembly having a center roller and at least a pair of wing rollers flanking the center roller,
- a first pair of pivotal connectors, one at each end of the roller assembly, for pivotally connecting each end of the roller assembly to an adjacent rope sideframe,
- the pivotal axes of said first pair of pivotal connectors being disposed substantially perpendicular to the plane of that portion of a conveyor belt thereabove so as to enable the wing and center rollers to swing as a unit, alternately about the outer end of each of said wing rollers through at least a limited arcuate path in a plane generally parallel to the plane of the portion of the conveyor belt supported thereabove,
- and a second pair of pivotal connectors,
- said second pair flexibly connecting the center roller to flinking wing rollers,
- the pivot axes of the second pair of pivotal connectors being disposed greater than 90 degrees from the pivot axes of the first pair of pivotal connectors in a forwardly, downwardly direction,
- whereby a generally vertically downwardly directed load induces a slightly rearwardly displacement of the center roller and a consequent increase in training effect.

References Cited in the file of this patent
UNITED STATES PATENTS

| | | |
|---|---|---|
| 2,776,044 | Lo Presti | Jan. 1, 1957 |
| 2,880,851 | Salmons | Apr. 7, 1959 |
| 2,908,958 | Arndt | Oct. 20, 1959 |